June 16, 1942.  W. H. MUSSEY  2,286,563
CAR TRUCK
Filed Dec. 11, 1936   3 Sheets-Sheet 1

INVENTOR:
WILLIAM H. MUSSEY
BY Gilson, Maun & Co
ATTORNEYS

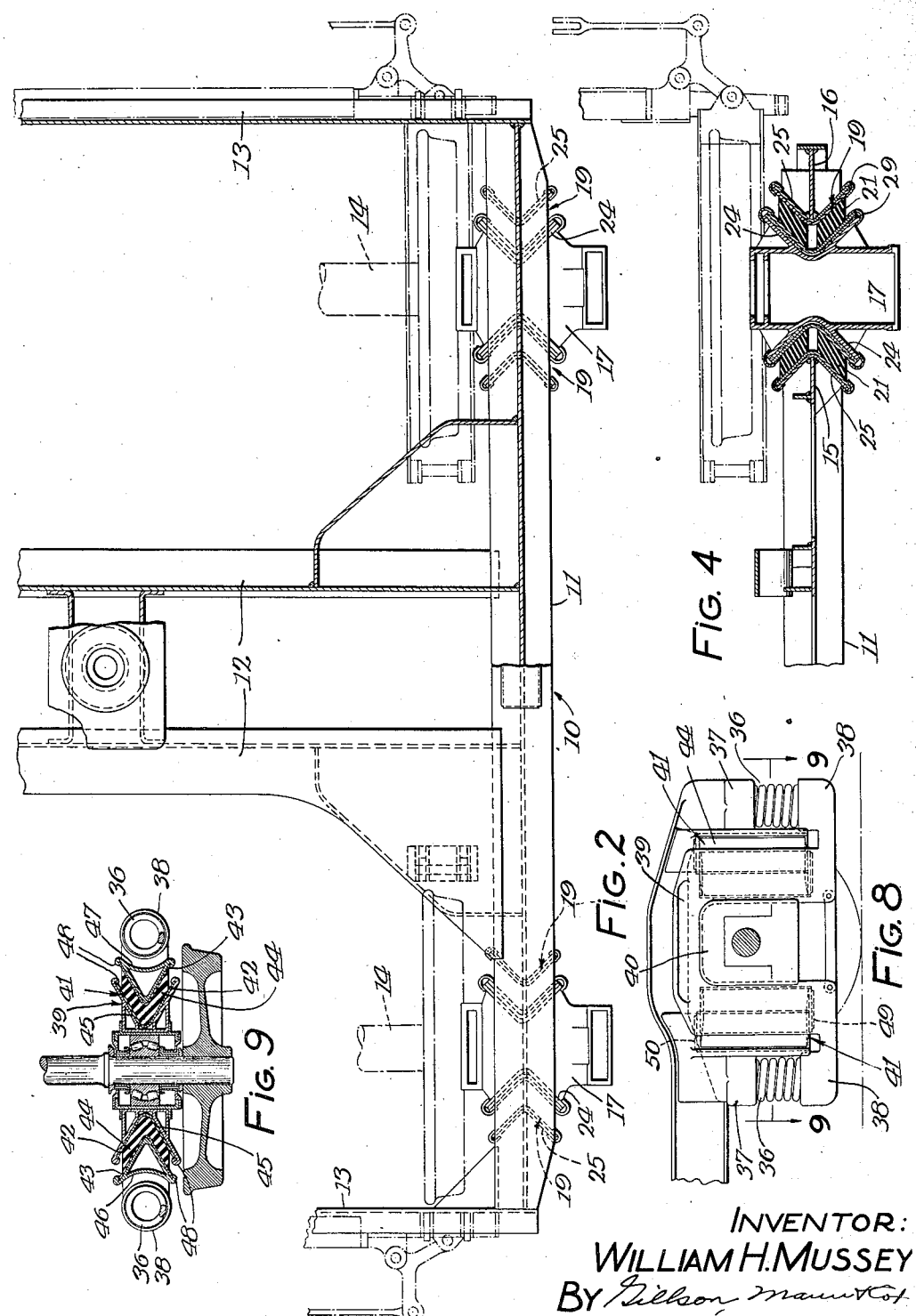

June 16, 1942.      W. H. MUSSEY      2,286,563
CAR TRUCK
Filed Dec. 11, 1936      3 Sheets-Sheet 3
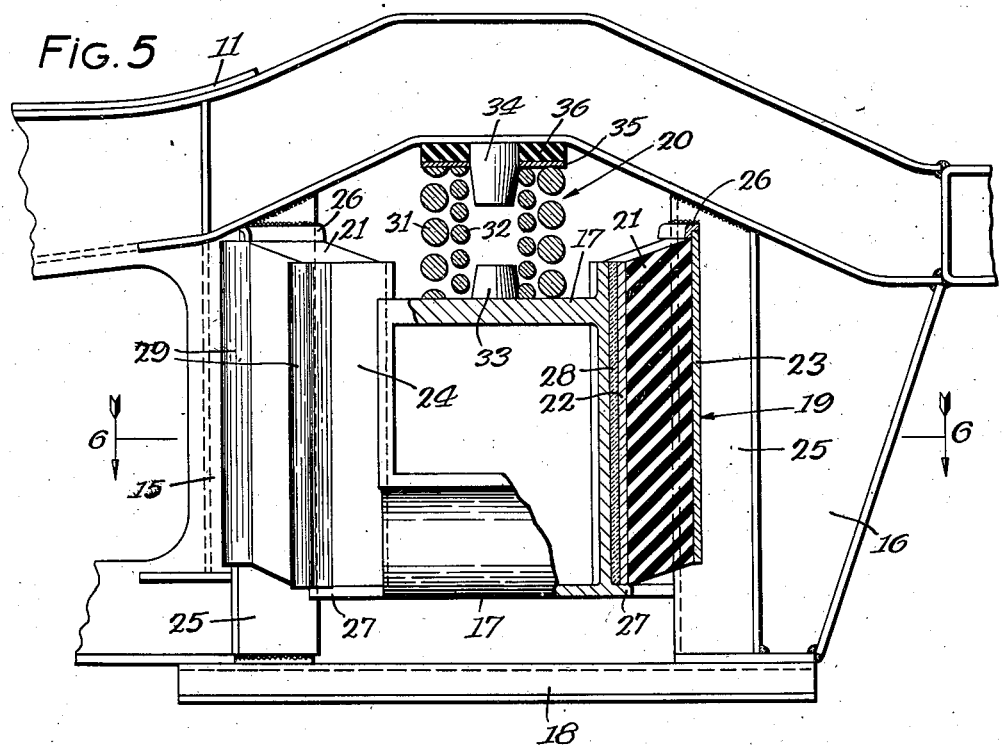
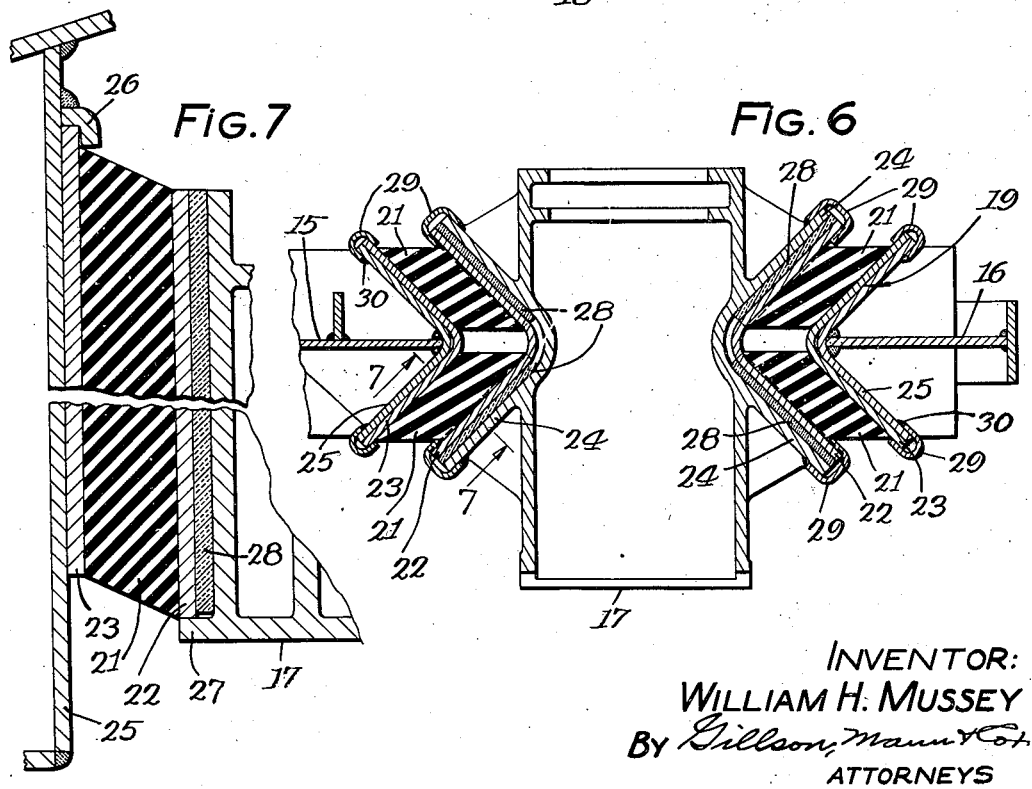
INVENTOR:
WILLIAM H. MUSSEY
By Gillson, Mann & Co.
ATTORNEYS Patented June 16, 1942

2,286,563

UNITED STATES PATENT OFFICE 2,286,563

CAR TRUCK

William H. Mussey, Chicago, Ill., assignor to Pullman-Standard Car Manufacturing Company, a corporation of Delaware Application December 11, 1936, Serial No. 115,424

6 Claims. (Cl. 105—224.1)

In U. S. Patent No. 2,181,908, granted December 5, 1939, on my copending application, Ser. No. 719,881, filed April 10, 1934, I have disclosed a car truck in which the truck frame is supported on the car axles by means of rubber under shear and coil springs, the latter being arranged so that the dead load is removed from the rubber in order to prevent setting of the rubber.

The present invention is an improvement on the disclosure of the above identified application, and in order to understand the advantages of the present invention over the truck shown in the copending application referred to, it will be helpful to consider the extent to which vertical, longitudinal and lateral movement of the truck frame relative to the axles should be permitted in order to obtain maximum riding comfort.

The greatest forces to be absorbed by the resilient mounting of the truck frame on the car axles are vertical forces, and so these forces should be absorbed by permitting a relatively long range of travel between the truck frame and the axles in a vertical direction. Lateral forces are often quite substantial, but are ordinarily not as large as the vertical forces. The range of travel, therefore, between the truck frame and the car axles in a lateral direction should be correspondingly smaller. Longitudinal forces should be dampened with considerable restraint, for if too great movement is permitted between the axles and the truck frame, the truck will ride rough, and there is considerable danger of derailment.

The principal object of this invention, therefore, is to provide a resilient mounting for a truck frame on two or more car axles which permits relative movement between the frame and the axles in somewhat the proportion stated above, i. e., relative vertical movement is comparatively large, relative longitudinal movement is comparatively small, and relative lateral movement is a value somewhere between the other two.

Other objects and advantages are to facilitate assembly of the truck frame on the car axles, to make inspection and correction of the resilient mounting adjustment more convenient, and to reduce cost of manufacture and maintenance.

As the disclosure proceeds, further objects and advantages will become apparent, and in the accompanying drawings—

Fig. 2 is a fragmentary plan view of the trucks;

Fig. 4 is a sectional view taken on the line 4—4 of Fig. 1;

Fig. 5 is an elevational view showing one of the journal boxes and the manner of supporting the frame from the box, a portion of the view being in section;

Fig. 6 is a horizontal, sectional view taken on the line 6—6 of Fig. 5;

Fig. 7 is a vertical, sectional view taken on the line 7—7 of Fig. 6;

Fig. 8 is a side, elevational view of a modified form of the invention; and

Fig. 9 is a horizontal, sectional view taken on the line 9—9 of Fig. 8.

The disclosure of preferred forms of the invention is in compliance with section 4888 of the Revised Statutes, but the appended claims should not be limited to the specific forms shown and described unless required by the prior art.

Figure 1:
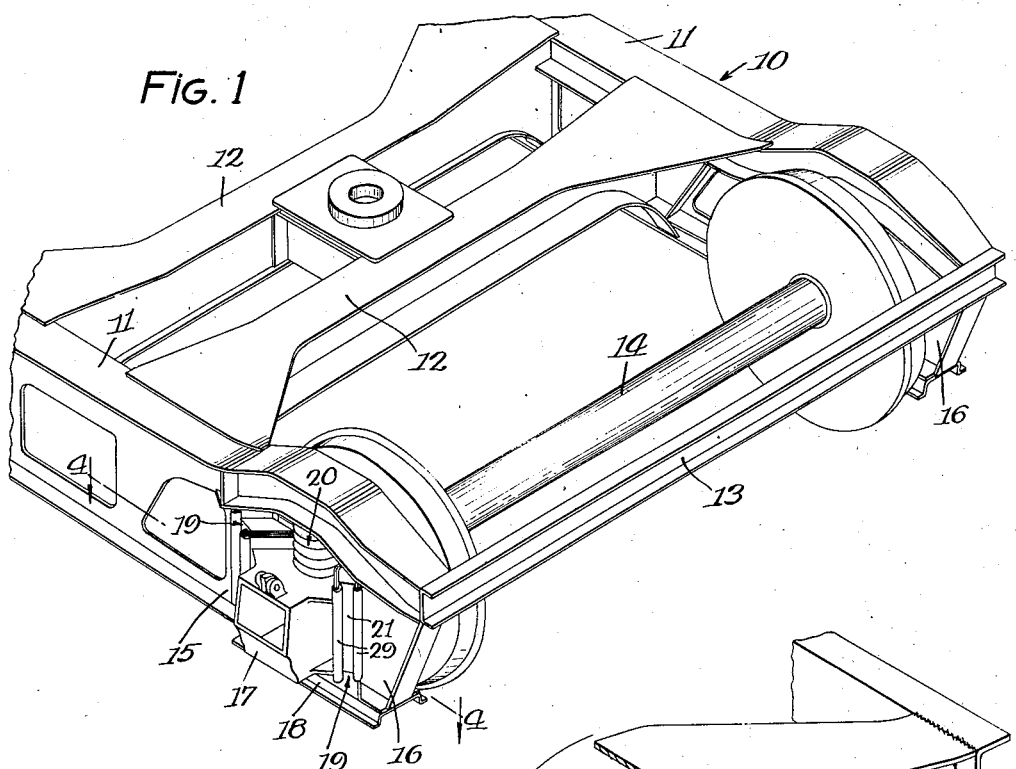
Fig. 1 is a fragmentary, perspective view of a truck embodying my invention.

Referring first to Figs. 1 and 2, the reference character 10 designates a car truck composed of side frames 11, 11, transoms 12, 12, end rails 13, 13 and wheeled axles 14, 14. The truck frame is built up of a plurality of sheet metal parts of proper shape and size for carrying the stresses to which the frame is subjected. All parts are securely welded together, as indicated in the drawings.

The resilient mounting of the truck frame on the car axles is the same at all four journal boxes, and so only one will be described.

At the end of the side frame 11, spaced pedestal arms 15 and 16 are provided between which a journal box 17 is adapted to float. When the frame has been mounted on the journal box, a bottom tie bar 18 is bolted in place, as usual.

The resilient mounting for the truck frame on the journal box consists of rubber spring units 19 interposed between the sides of the journal box and the pedestal arms, and a coiled spring unit 20 interposed between the top of the journal box and the bottom of the truck frame.

The rubber spring units 19 each comprise a pair of rubber blocks 21, 21 of oblique parallelepipedon form bonded by vulcanizing or other suitable processes to V-shaped hardened steel plates 22 and 23.

Figure 3:
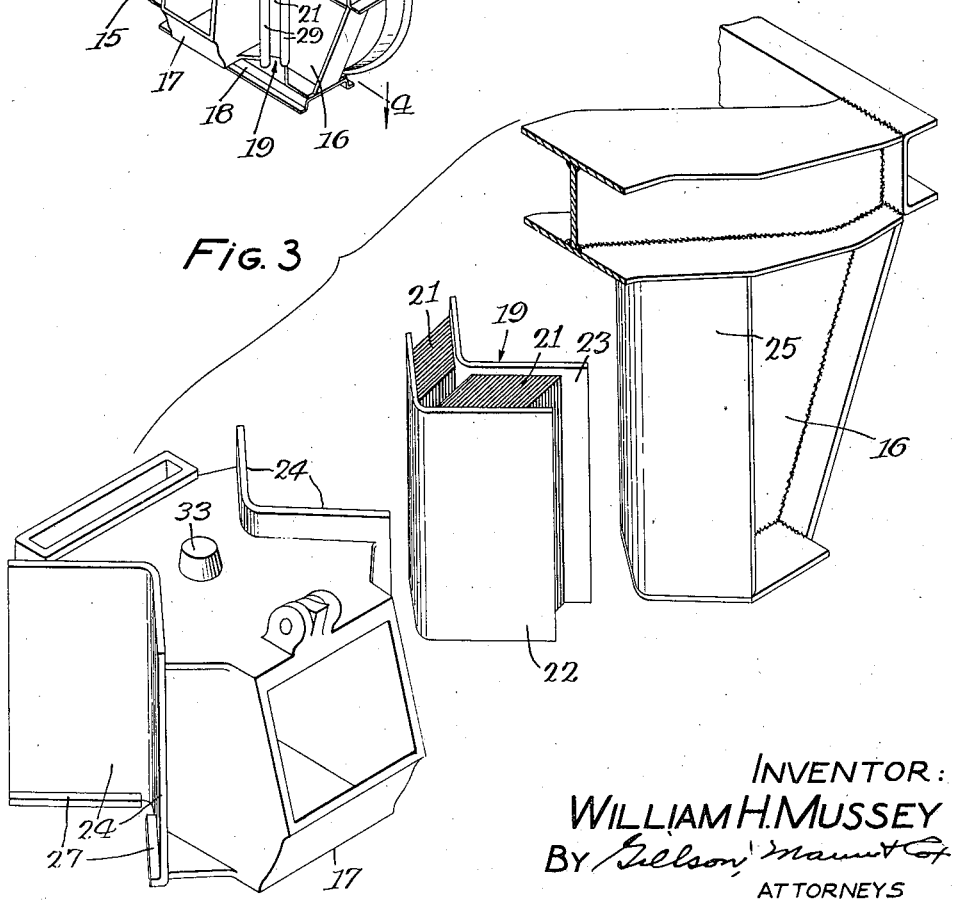
Fig. 3 is an exploded perspective view showing the manner in which the rubber element is interposed between the journal box and the pedestal arm of the truck frame.

The sides of the journal box and the inner faces of the pedestal arms are provided with complementary V-plates 24 and 25, respectively, to receive the rubber spring units 19, as best shown in Figs. 3, 4 and 6. The plate 23 of each rubber spring unit is adapted to fit under an angle lip 26 welded to the V-plate 25 of each pedestal arm 15 and 16, and the lower edge of each rubber spring unit rests upon ledges 27 preferably integral with the V-plates 24. Load is therefore transferred, so far as the rubber spring units are concerned, from the truck frame through the lips 26 to the plates 23, thence through the rubber under shear to the inner plates 22, the ledges 27 and finally the journal box 17.

In order to prevent excessive heat from the journal box from damaging the rubber spring units, asbestos plates 28 are preferably inserted between the plates 22 of the spring units, and the plates 24 constituting a part of the journal box. The rubber units are held in place laterally by channel clips 29 suitably welded to the adjoining plates, as indicated at 30.

The asbestos plates 28 also serve as shims to provide the desired tightness of fit for the rubber spring units, but metal plates may be used in place of, or in conjunction with, the asbestos plates for the purpose.

The coil spring unit 20 preferably comprises a double coil spring having an outer coil 31 and inner coil 32 concentrically arranged over knobs 33 and 34 on the journal box and truck frame, respectively. The top of the coil spring unit bears upon an annular plate 35 behind which is a rubber annulus 36 which serves primarily as a sound deadener.

When the rubber spring units 19 are free from load, the top of the plate 23 is a known distance above the top of the plate 22, or in other words, the top surface of the rubber makes a known angle with the horizontal. It is desirable to have the coil spring unit 20 adjusted so that when the car is under light load, the rubber will not be under any considerable stress, and the adjustment can readily be checked by observing the deflection of the rubber and noting the relative position between the top edges of the plates 22 and 23. If, upon inspection, it is found that the dead load is being supported to an undesirable extent by the rubber units, it is a simple matter to insert a shim between the plate 35 and the coils of the spring unit 20 to make the coil spring unit bear a greater part of the dead load and relieve the rubber spring units by a corresponding amount. Obviously, instead of adding a shim below the plate 35, a plate of greater thickness may be substituted for the plate 35.

In assembling the truck frame on the journal box, the frame is allowed to drop down over the journal box while the rubber spring units 19 are held in place against the sides of the journal box and are guided along the V-plates 25. The coil spring unit 20 mounted on the top of the journal box will engage the truck frame during the lowering of the frame before the top of the plate 23 reaches the lip 26 and will be compressed as the frame continues to be lowered until the frame is supported entirely by the coil spring unit. When the car body (not shown) is placed on the truck, the additional load compresses the coil spring unit 20 further and the additional lowering of the truck frame relative to the journal box brings the top edge of the plate 23 into engagement with the lip 26 of the pedestal arms. If desired, dowels may be passed through the adjacent plates 22 and 24, and 23 and 25 to hold the rubber spring unit 19 in its assembled position, and this has the advantage of better utilizing the rubber to resist upward movement of the truck frame, relative to the journal box.

Instead of having a single coil spring unit 20 mounted on the journal box in parallel with the rubber spring units 19, it may be desirable to employ two coil spring units 36 on opposite sides of the journal box, as shown in Figs. 8 and 9. In this arrangement, the truck frame is provided with downwardly opening pockets 37, 37 in vertical alinement with upwardly opening pockets 38, 38, integral with or rigidly attached to a yoke 39 seated upon the journal box 40. The coil spring units 36 seat within the pockets 37 and 38, and together have sufficient capacity to carry the dead load of the car. The live load of the car is adapted to be carried not only by the coil spring units 36, but also by rubber spring units 41 acting in parallel with the coil spring units 36. The rubber spring units 41 are similar to the corresponding units shown in Figs. 1-7 inclusive, each comprising an inner V-plate 42, an outer V-plate 43, and a rubber element 44, the latter being vulcanized or otherwise bonded to the two plates. The rubber spring unit is adapted to fit within a V-shaped pocket 45 provided in the arms of the yoke 39, and V-shaped pedestal arms 46 and 47 attached to the truck frame hold the rubber spring units within the pockets 45 of the yoke.

Integral lips 48 on the yoke casting and pedestal arms hold the rubber spring units in place laterally, and load is transmitted from the journal box to the truck frame through the rubber spring units 41 by means of seats 49 which are a part of the yoke casting 39 and upon which the inner plates 42 rest, and ledges 50 which are a part of the pedestal arms and against which the outer plates 43 of the rubber spring units 41 bear.

By way of illustration, for a car having a light load per journal box of approximately 6000 pounds, it is satisfactory to use rubber spring units of the type shown in Figs. 1-7 inclusive, each rubber piece having hardness corresponding to a durometer reading of 30 and normal dimensions of 3¼"x1¼"x10". In the form of invention shown in Figs. 8 and 9, it is satisfactory to use a V-shaped rubber element which has a durometer value of 30, a thickness of 1¾", a depth of 15" and a width of 5½" for each leg of the V.

In all cases, the coil springs used for carrying the dead load (or a substantial part of it), have a range of travel and total load capacity such that the rubber spring units, acting in parallel with the coil springs, take a substantial part, if not the greater part of the live load, without having the coil units go solid until the live load is increased to such an extent that the rubber has been subjected to its maximum safe limit of shearing stress.

Obviously any other type of spring might be used in place of the coil springs so long as it is capable of carrying the dead load and still permits the rubber spring units to take the greater part of the live load. Leaf springs and volute springs, for example, are suitable types.

I claim:

1. In a car truck, a journal box, a truck frame having pedestal arms straddling the box, a rubber spring unit interposed between a side of the box and one of the arms to provide a resilient mounting of the frame on the box, means including a substantially V-shaped pocket for mounting the rubber spring unit so that relative movement between the frame and the box in a vertical direction places the rubber in shear, in a lateral direction places the rubber in shear and in compression, and in a longitudinal direction places the rubber in compression with substantially no shear, and means including a coil spring for relieving the rubber of substantially all dead load.

2. In a car truck, a journal box, a truck frame having pedestal arms straddling the box, and a rubber spring unit interposed between a side of the box and one of the arms to provide a resilient mounting of the frame on the box, said unit comprising a pair of spaced substantially V-shaped plates and a pair of rubber blocks positioned between and vulcanized to the plates, one on each side of the apex of the V.

3. In a car truck, a journal box, a truck frame having pedestal arms straddling the box, a rubber spring unit interposed between a side of the box and one of the arms to provide a resilient mounting of the frame on the box, said unit comprising a pair of spaced vertically positioned substantially V-shaped plates and a pair of rubber blocks between and vulcanized to the plates, one on each side of the apex of the V, means for securing each rubber unit to one side of the box and the pedestal arm, and an asbestos plate between the unit and the journal box.

4. In a car truck, a journal box, a truck frame having pedestal arms straddling the box, and means for supporting the frame on the box, said means including metal and rubber spring units interposed between the truck frame and the box, the rubber spring unit being located between the sides of the journal box and the pedestal arms and being adapted to act in a shear when subjected to vertical loading, and the metal spring unit being so arranged and having such strength that it relieves the rubber spring unit of the greater part of the dead load but is sufficiently yieldable and has a sufficient range of travel, relative to the rubber spring unit, to permit free, substantially unlimited, maximum, downward deformation of the latter within its maximum safe limit of shearing stress to sustain a substantial part of the live load, so as to effectively dampen vibrations.

5. In a car truck, a journal box, a truck frame having pedestal arms straddling the box, and means for supporting the frame on the box, said means including metal and rubber spring units interposed between the truck frame and the box, the rubber spring unit being located between the sides of the journal box and the pedestal arms and being adapted to act in shear when subjected to vertical loading, and the metal spring unit being so arranged that it relieves the rubber spring unit of the greater part of the dead load, said metal spring unit having a range of travel such as to cause the rubber spring unit, acting in shear, to sustain the greater part of the live load.

6. In a car truck, a journal box, a truck frame having pedestal arms straddling the box and means for supporting the frame on the box, said means including a metal spring unit interposed between the truck frame and the box and including also a rubber spring unit located between a side of the journal box and the adjacent pedestal arm and adapted to act in shear when subjected to vertical loading, the rubber spring unit having characteristics which cause it to effectively absorb quick acting live loads, and the metal spring unit being so arranged and being of such strength that it assists in carrying the dead load but has sufficient yieldability and a sufficient range of travel relative to the rubber spring unit to permit free, substantially unlimited, maximum, downward deformation of the latter within its maximum safe limit of shearing stress to sustain a substantial part of the live load and to effectively dampen vibrations.

WILLIAM H. MUSSEY.